THOMAS BRETT.

Improvement in Spring Seats for Harvesters.

No. 4,859.

Reissued April 9, 1872.

Witnesses.

J. H. Burridge.

D. S. Humphrey.

Inventor.

Thos Brett.

per Burridge & Co.

Attorys

UNITED STATES PATENT OFFICE.

THOMAS BRETT, OF GENEVA, OHIO.

IMPROVEMENT IN SPRING-SEATS FOR HARVESTERS.

Specification forming part of Letters Patent No. 124,113, dated February 27, 1872; reissue No. 4,859, dated April 9, 1872.

*To all whom it may concern:*

Be it known that I, THOMAS BRETT, of Geneva, in the county of Ashtabula and State of Ohio, have invented a certain new and Improved Harvester-Seat; and I do hereby declare that the following is a full, clear, and complete description thereof, reference being had to the accompanying drawing making part of the same.

SPECIFICATION.

Figure 1:
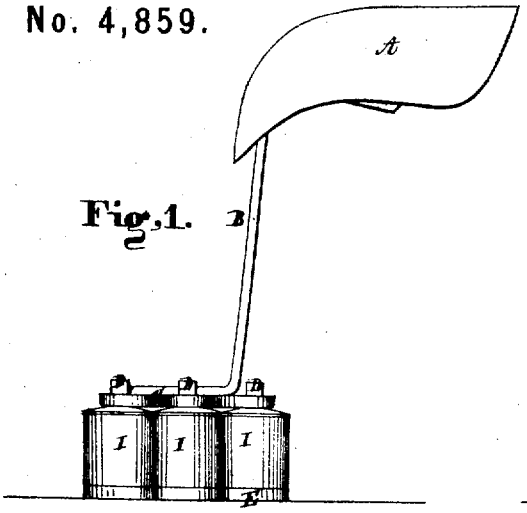
Figure 2:
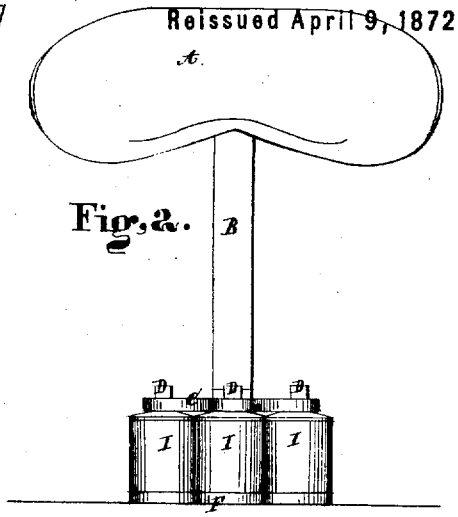
Figure 3:
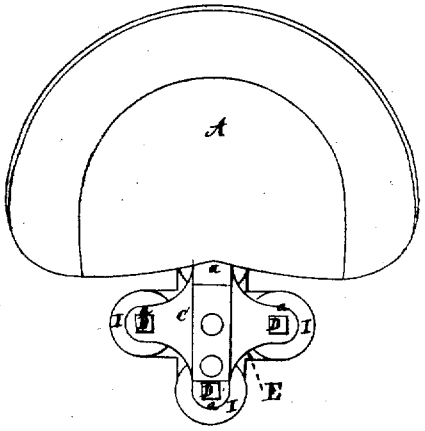
Figure 4:
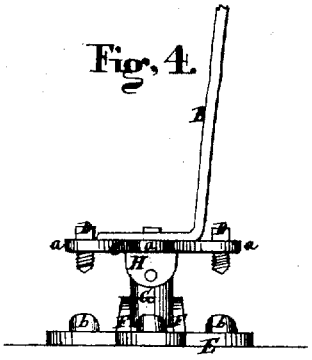
Figure 5:
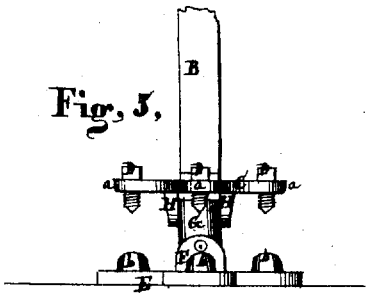
Figure 6:
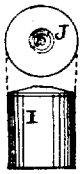
Figure 7:
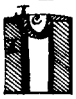
Figure 8:
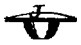

Figure 1 is a side view of the harvester-seat. Fig. 2 is a front view of the same. Fig. 3 is a top view. Figs. 4 and 5 are views having the springs detached. Figs. 6, 7, and 8 are detached sections.

Like letters of reference denote like parts in the different views.

The object of this invention is to provide an easy, safe, durable, and universal spring-movement to the seat used upon harvesters, arranged and constructed in such a manner as to relieve the driver, especially from the disagreeable and dangerous side motion or jar of the machine, and one that can be readily and conveniently adjusted to the weight of any who may ride upon it. The seat is supported upon a standard secured in a substantial manner at the bottom to a suitable hinged piece, which is connected by a pivoted joint to the machine; said hinged piece being supported substantially by rubber blocks, or other springs made adjustable, to give the seat different inclinations or positions, and to suit the weight of the driver by giving more or less tension to one or more or all of the springs by the use of thumb or set-screws.

A represents the seat, secured to the top of the standard B; whereas the foot or bottom of the standard is fixed to a stay or plate, C, having projecting lugs or ears, *a*, Fig. 3, in which are fitted adjusting-screws D, the purpose of which will presently be shown. E, Figs. 4 and 5, is also a stay or plate, corresponding substantially in shape to the stay C, but larger. Said stay E is bolted to the machine, or may be constructed as a part of the machine frame, for the purpose of more conveniently or securely attaching the improvement to the machine. In the middle of this stay is a pair of lugs or ears, F, Fig. 4, between which is pivoted a stud, G, so that it may have a vibratory movement therein. To the upper end of the stud G is pivoted in like manner the stay C referred to, said stay C being provided with ears or lugs H, between the cheeks of which the stud is pivoted, as shown in the drawing, Figs. 4 and 5, by which means the stay is allowed a vibratory movement transversely to that obtained by the stud G.

It is not my intention to make the above description of a hinged joint a material element of my invention; but, I desire to point out and set forth as an essential element of my invention a universal hinged joint at the foot of the standard.

Connecting the seat to the top of the standard by means of a link or hook-and-eye connection, (which has been done,) is objectionable, as by this construction the seat is still subject to violent lateral and longitudinal sway, or sudden jars or jolts. With my improvement this objection is removed by means of the standard being hinged to the machine at its bottom or foot, and there supported, substantially as described, by rubber blocks or other springs, by means of which the seat is retained upon a central point of motion, which prevents any lateral strain upon the springs, and at the same time, by reason of the jolts being communicated to the foot of the standard, the seat is permitted to have an easy, vibratory, or swaying motion, in a great degree independent of the irregular motions of the machine.

Between each of the projecting ears *a* of the two stays, C E, is interposed a rubber block or other spring, I, Figs. 1 and 2, a detached view of which is shown in Fig. 6, of which Fig. 7 is a transverse vertical section. Said springs I are retained in position between the ears by means of ribs *b* on the stay E, which project into the ends of the springs, thereby preventing the lower ends from being displaced. The upper ends of the springs are retained in place by the adjusting screws D above referred to. The ends of the springs are covered with caps J, Figs. 6 and 7, having a central dent, *c*, dropped into the end of the springs, and into the dents the ends of the adjusting-screws are lodged, thereby keeping the springs in place. The position of the springs, in relation to the stays C E, is shown in Figs. 1 and 2. By means of the springs interposed between the two stays the seat is kept in an erect and proper position for being set upon—that is to say, in the position shown in the drawing, Figs. 1 and 2.

My intention, in the foregoing description, is to represent the use of springs, one or more, interposed between the plates arranged at the foot of the standard, substantially as described in the drawing and specification, and not to represent the definite number of springs used therein as an essential element of my invention.

Now, as the machine, while in use, may toss violently from side to side, and its motion be very unsteady, and consequently dangerous to ride upon, it will be obvious that the several springs, I, will be constantly in proper position to steady and support the seat in an erect and safe position to be ridden upon. When the motion of the machine is such as to throw the weight of the seat in any direction from the center of the hinged joint at the foot of the standard, then the several springs, in their turn, when acted upon, will receive the weight with an easy elastic resistance, removing entirely from the seat the rigid jar and jolting so common to reapers, thereby enabling the operator to preserve his place thereon with such ease and security that, with ordinary care the danger of being thrown off the machine is removed, though the motion of the machine may be violent.

In case the machine should be operated upon the hill-side by means of the adjusting-screws D, the seat with its weight thereon may be balanced in respect to its gravity without reference to its being upon the hill-side.

*Claims.*

What I claim as my invention, and desire to secure by Letters Patent, is—

1. A seat for harvesters having its supporting standard hinged at the bottom or foot, in combination with rubber blocks I or other springs made adjustable to the weight of the driver by the use of set-screws, substantially as described, and for the purpose specified.

2. The plate C, adjusting-screws D, in combination with the caps J, and springs I, substantially as described, and for the purpose set forth.

3. The stays or plates C E, connected together by means of a pivoted or hinged joint at the foot of the standard B, in combination with the seat A and springs I, substantially as and for the purpose specified.

THOMAS BRETT.

Witnesses:
DENNIS THORP,
V. T. WEBB.